(12) United States Patent
Duesselberg et al.

(10) Patent No.: US 7,348,485 B2
(45) Date of Patent: Mar. 25, 2008

(54) POWER TOOL WITH INTERNAL FASTENING ELEMENT

(75) Inventors: Achim Duesselberg, Hangzhou (CN); Andre Ullrich, Filderstadt-Bernhausen (DE); Kurt Sieber, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 11/179,537

(22) Filed: Jul. 13, 2005

(65) Prior Publication Data

US 2006/0021775 A1    Feb. 2, 2006

(30) Foreign Application Priority Data

Jul. 29, 2004    (DE)    ............... 10 2004 036 805

(51) Int. Cl.
*H02G 3/08*    (2006.01)
(52) U.S. Cl. ............. 174/50; 174/135; 174/520; 310/50
(58) Field of Classification Search ............ 174/50, 174/135, 17 R, 52.1, 520; 310/50, 239, 248, 310/47; 220/3.2, 4.02; 439/535, 536, 949; 173/170, 171, 217; 16/404; 451/357
See application file for complete search history.

(56) References Cited

U.S. PATENT DOCUMENTS

| | | | | | |
|---|---|---|---|---|---|
| 3,691,407 | A | * | 9/1972 | Klett et al. .................. | 310/50 |
| 3,710,154 | A | * | 1/1973 | Schilling ..................... | 310/50 |
| 3,747,280 | A | * | 7/1973 | Stroezel et al. ............ | 451/357 |
| 5,447,206 | A | * | 9/1995 | Coleman et al. ........... | 173/170 |
| 5,753,993 | A | * | 5/1998 | Steidle et al. ............... | 310/50 |
| 6,025,662 | A | * | 2/2000 | Nakane ....................... | 310/50 |
| 6,294,857 | B1 | * | 9/2001 | Nakane ....................... | 310/47 |
| 7,077,218 | B2 | * | 7/2006 | Justis et al. ................ | 173/217 |

* cited by examiner

*Primary Examiner*—Angel R. Estrada
(74) *Attorney, Agent, or Firm*—Ronald E. Greigg

(57) ABSTRACT

The present invention relates to a power tool, including at least a first and a second housing part, many components, in particular electric motor components or electrical components, and one fastening element for fastening the many components to the first housing part in such a way that the components are fixed between an inside of the first housing part and the fastening element.

17 Claims, 2 Drawing Sheets

POWER TOOL WITH INTERNAL FASTENING ELEMENT

CROSS-REFERENCE TO RELATED APPLICATIONS

This application is based on German Patent Application 10 2004 036 805.8 filed Jul. 29, 2004, upon which priority is claimed.

BACKGROUND OF THE INVENTION

1. Field of the Invention

The present invention relates to a power tool having an additional fastening element which is located in the interior of the power tool.

2. Description of the Prior Art

Power tools in various forms are known from the prior art. Typically, power tools have two housing halves, which surround many components of the power tool. The components are usually electrical or electromechanical components of the electric motor, and these components are clamped between the two housing halves. The result can be imprecise positioning or fixation. Assembly is also relatively complicated, since the components are first placed loosely in one housing half and then fixed only when the second housing half is fastened to the first housing half. Moreover, this kind of fixation of the internal components of the power tool has disadvantages if the power tool is dropped, since if there is damage to the housing, the fixation of the internal components can also easily be damaged. It is also known to fasten the internal components of a power tool individually or to make them in the form of complex composite components. A complex composite component of this type for instance includes a bearing component, with which throttles and a brush holder are integrated by spray-coating. In the case of single fixation of the internal components on the housing, however, many different fixation points result, making assembly very expensive. Moreover, this has design limitations for the housing, since many fastening domes must be provided on the housing, so that the individual components can be accurately positioned by and fastened to them. The use of complex composite components further has the disadvantage that the production of such components is very expensive. Moreover, this has disadvantages in servicing, particularly since the entire composite component must always be replaced even if only a small part of the composite component is damaged. Moreover, recycling such composite components is relatively complicated and expensive.

OBJECT AND SUMMARY OF THE INVENTION

The power tool according to the invention has the advantage over the prior art that fastening internal components of the power tool in a housing part can be done very inexpensively. According to the invention, the positioning and the fixation of the components are separate in the assembly process. Moreover, a power tool according to the invention involves fewer compromises in terms of the design of the housing parts, since the shaping, selection of material, and elasticity of the housing and also the position of the screw domes can be selected more freely. This is attained according to the invention in that an internal fastening element is provided which simultaneously fixes many internal components of the power tool. Thus it is no longer necessary to provide one or more fixation points for every internal component; all that is needed is fixation points for the fastening component, so that screw domes, for instance, on the housing parts can be dispensed with. As a result, the power tool has a lower weight and can be produced more cheaply, and there are also advantages in terms of injection molding for the housing parts. The components fixed by the fastening element of the invention are fixed more securely in the event that the power tool is dropped than if they were merely clamped between two housing halves, since in the interior of the power tool, the fastening element is no longer directly exposed to the impact of the power tool. Moreover, if the housing parts are opened for servicing or the like, the internal components continue to be fixed by the fastening element. Moreover, mistakes in mounting the other housing parts onto the first housing part can be avoided.

To enable simple positioning of the internal components of the power tool, the first housing part preferably has positioning elements. The positioning of the internal components is preferably done by clamping or by plugging them in. After the positioning, the components are fixed by means of the fastening element, which is solidly joined to the first housing part.

The fastening element is preferably fastened to the first housing part by means of clips, screws, adhesive, rivets or calking. To enable the simplest possible recycling and the most economical possible repairs, a re-releasable type of fastening, such as clips or screws, is preferably used.

Also preferably a guide conduit for carrying air is provided. The fastening element can accordingly make further functions possible, such as an air conducting function or improved electrical safety by securing air and creep paths. A guide conduit for guiding cables and lines is preferably also provided on the fastening element. Hence a cable guide function can additionally be taken on by the fastening element. It should be noted that it is also possible provide only a single conduit, which takes on the function of air guidance and cable guidance.

Also preferably, the fastening element includes additional fixation regions, for fixing further components of the power tool directly to the fastening element. As further components, throttles or other electrical components of the electric motor, for instance, can be fixed to the fastening element.

Also preferably, the fastening element has an electrical contact lug and/or at least one cable hold-down device. As a result, the fastening element can also take on a contact-making function or a fixation function for cables of the electric motor.

The fastening element is preferably made from plastic or sheet metal. For fastening the fastening element to the housing part of the power tool, screw domes are preferably provided, to which the fastening element is fastened releasably.

The power tool is preferably a drill hammer. Since the production costs can be reduced significantly by means of the provision, according to the invention, of a separate fastening element for fixation of the internal components, the cost advantages are great, since such power tools are mass-produced in large numbers.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
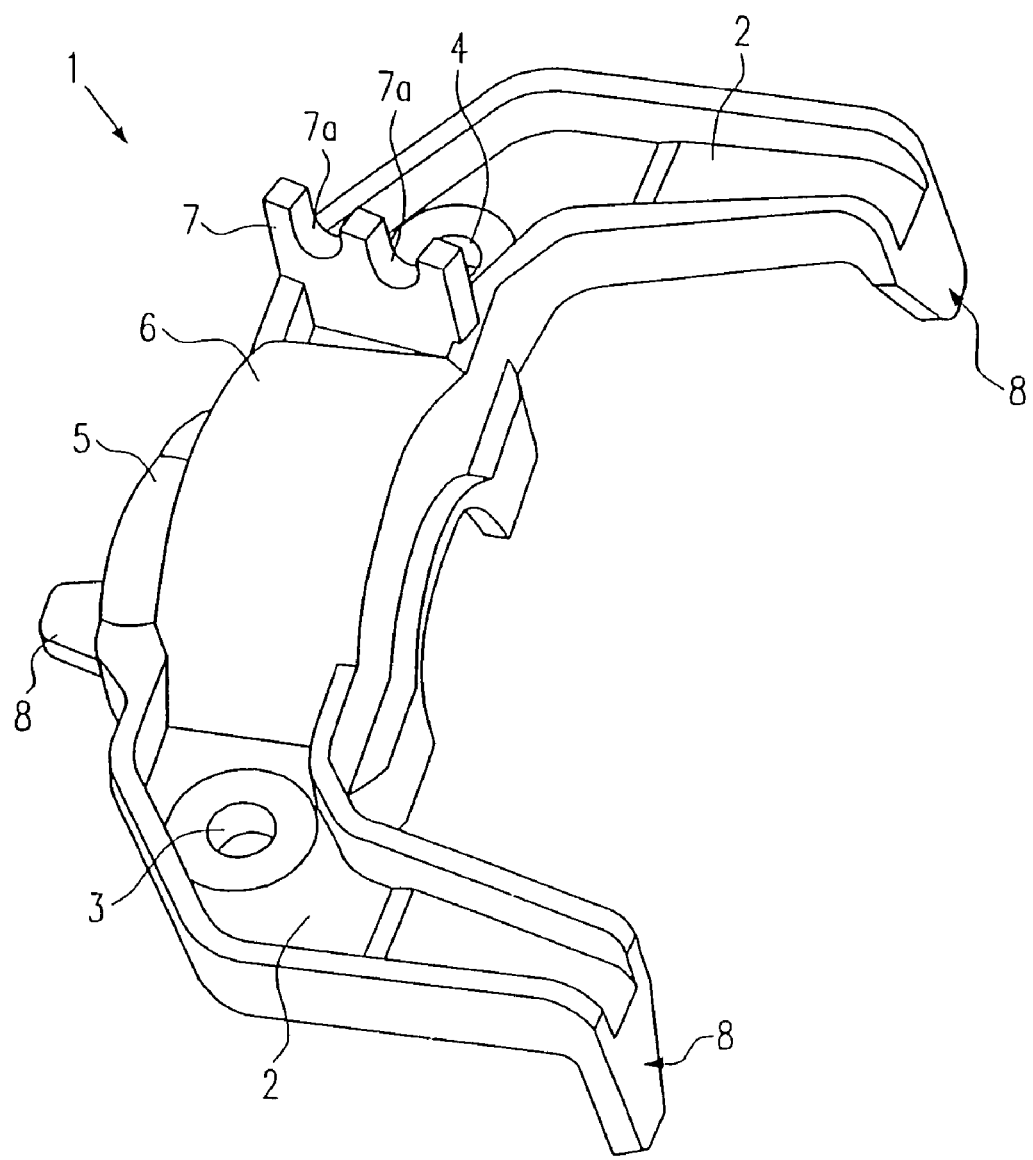
FIG. 1 is a perspective view of a fastening element in accordance with an exemplary embodiment of the present invention.

As can be seen from FIG. 1, the fastening element 1 according to the invention is constructed in the manner of a bridge and has a common air and cable guide conduit 2 on both sides. Two bores 3, 4 are provided in the fastening element 1, by means of which the fastening element 1 can be fastened releasably to a first housing part 13 (see FIG. 2) by means of screws. The bores 3, 4 are provided in the region of the air and cable ducts.

A dust guard 5 for an armature bearing and a middle covering region 6 are provided in a middle region of the fastening element 1. The covering region 6 is curved and in particular covers an armature shaft 16 (see also FIG. 2). A cable fixation 7 is also provided on the fastening element 1 and has recesses 7a, for positioning cables on the fastening element 1. The recesses 7a are substantially U-shaped and are covered by an inner region of a second housing part in the process of mounting of the second housing part onto the first housing part, so that the cables passed through at there are fixed.

Figure 2:
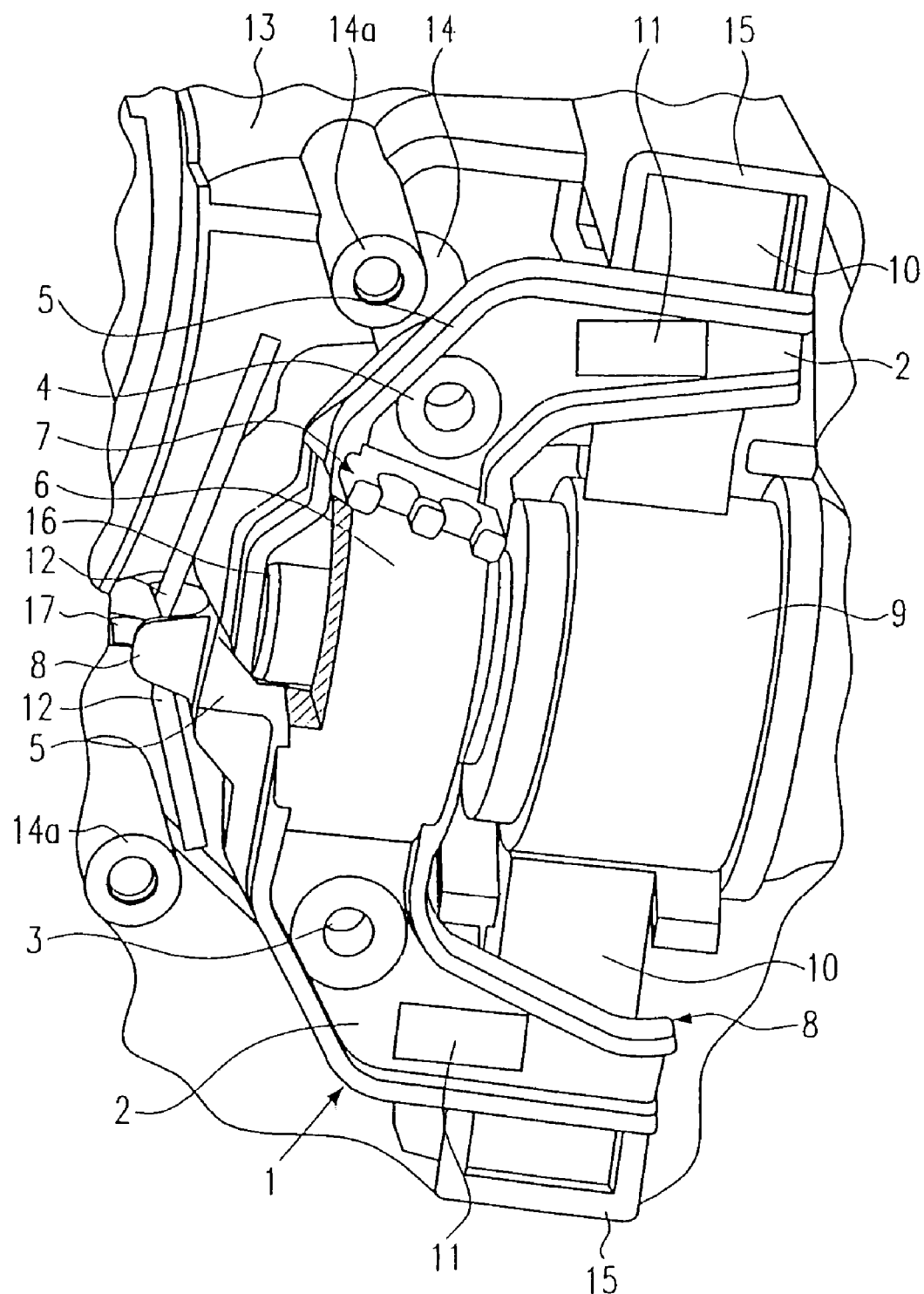
FIG. 2 is a perspective view of the fastening element shown in FIG. 1, in its installed position on a housing component.

Three cable hold-down devices 8 are also provided on the fastening element 1 and in conjunction with positioning elements 17, provided on the first housing part 13, for the cables they make a fixation of the cables on the first housing part 13 possible (see FIG. 2). The positioning element for the cables is likewise essentially U-shaped, and the cable hold-down devices 8 cover the upper and lateral open regions of the positioning elements 17, once the fastening element 1 has been mounted on the first housing part 13.

In this exemplary embodiment, the fastening element 1 is embodied as a plastic injection-molded part and can be furnished especially economically. FIG. 2 shows the mounted state of the fastening element 1 on the first housing part 13; for the sake of a clearer drawing, the screws used for direct fastening are not shown. The bores 3, 4 in the fastening element 1 are therefore visible in FIG. 2. The bores 3, 4 are each located above a respective screw dome 14 (in FIG. 2, only one screw dome 14 is visible), so that the screws can be screwed into the screw dome 14 and the fastening element 1 can be fixed to a single housing part.

Further screw lugs or domes 14a are embodied integrally on the first housing part 13, to make it possible to screw it together to a second housing part, not shown. Also provided are positioning elements, formed integrally on the first housing part 13, for positioning the individual internal components of the power tool prior to the fixation by the fastening element 1. More precisely, positioning elements 15 for a brush 10 or a brush cage (quiver), in which the brushes are located, is provided, and positioning elements 17 for cables 12 are formed integrally on the first housing part 13. In addition, positioning elements for the armature shaft 16 or the armature 9 are also formed integrally in the first housing part 13 but are not identified by reference numeral for the sake of simplicity in the drawing.

As can also be seen from FIG. 2, still further components of the electric motor are located on the fastening element 1. In this exemplary embodiment, there are two throttles 11, one in the each of the air and cable ducts 2 of the fastening element 1. It should be noted that the throttles 11 can for instance be jointly injection-molded during the injection molding production of the fastening element 1, or the throttles can be located on the fastening element 1 afterward.

As can be seen from FIG. 2, in this exemplary embodiment the fastening element 1 is embodied as a fastening bridge, which is located in a commutation region of the electric motor. As a result, the internal components of the power tool, in particular the electrical components, such as the armature 9, throttles 11, brushes 3 or brush holders, and cables 12, can be fixed by means of a single component. A plurality of positioning elements for the internal components of the power tool are provided on the first housing part 13, so that in the assembly process, in the first step, the individual components are positioned on the first housing part 13, and in a second step, the components are fixed by mounting the fastening element 1 on the first housing part 13. It is thus possible according to the invention for the individual components to be positioned exactly relative to one another, without requiring special auxiliary devices. Moreover, the first housing part 13 can be designed essentially freely, since individual fixation devices for the individual components can be dispensed with, since the fixation is effected exclusively by means of the common fastening element 1.

It should be noted that it is understood to be possible for two or more housing parts also to be joined by means of one common fastening element, should that be necessary for structural reasons. According to the invention, the fastening element 1 involves fewer compromises, in terms of its shaping, selection of material, elasticity, and the position of the connecting elements (bores 3, 4) than does a second housing part, for instance, that together with the first housing part in the prior art takes on the function of fixation of the internal components of the power tool.

It should be noted that if the fastening element 1 is completed for instance by an inserted electrical contact lug, the fastening element can also, by way of pressing against a brush holder, make an electrical contacting of this brush holder possible.

Thus by the simultaneous fixation of many internal components of the power tool, in particular the electric motor, by one common fastening element 1, a marked cost reduction with additional degrees of freedom in terms of the housing design can be attained in comparison with the prior art. The entire fastening element may also take on additional functions, such as air and cable guidance, dust protection, vision protection, and so forth.

The foregoing relates to a preferred exemplary embodiment of the invention, it being understood that other variants and embodiments thereof are possible within the spirit and scope of the invention, the latter being defined by the appended claims.

We claim:

1. A power tool comprising
    at least a first and a second housing part (13),
    a plurality of electrical components or electric motor components and
    one fastening element (1) for fastening the plurality of components to the first housing part (13) in such a way that the components are fixed between an inside of the first housing part (13) and the fastening element (1),
    the fastening element having at least two bores (3,4) both of which are adapted to accept mounting screws, wherein the one fastening element (1) is located in a commutation region of the power tool.

2. The power tool as recited in claim 1, wherein the first housing part (13) comprises a plurality of positioning elements (15, 17), for positioning at least selected ones of the components before the mounting of the fastening element (1) to the first housing part (13).

3. The power tool as recited in claim 2, wherein the positioning of the components in the positioning elements (15, 17) is effected by means of clamping or plugging in or pressing against.

4. The power tool as recited in claim 2, wherein the one fastening element (1) comprises a guide conduit (2) for carrying air and/or a conduit for guiding a cable.

5. The power tool as recited in claim 2, wherein the one fastening element (1) comprises further components (11), which are located directly on the one fastening element (1).

6. The power tool as recited in claim 2, wherein the one fastening element (1) comprises an electric contact lug and/or at least one cable hold-down device (8).

7. The power tool as recited in claim 3, wherein the one fastening element (1) comprises further components (11), which are located directly on the one fastening element (1).

8. The power tool as recited in claim 1, wherein the one fastening element (1) comprises a guide conduit (2) for carrying air and/or a conduit for guiding a cable.

9. The power tool as recited in claim 1, wherein the one fastening element (1) comprises further components (11), which are located directly on the one fastening element (1).

10. The power tool as recited in claim 1, wherein the one fastening element (1) comprises an electric contact lug and/or at least one cable hold-down device (8).

11. The power tool as recited in claim 1, wherein the one fastening element (1) comprises a covering region (5, 6) for covering dirt-threatened components.

12. The power tool as recited in claim 1, wherein the one fastening element (1) is produced from plastic or a sheet-metal material.

13. The power tool as recited in claim 1, wherein the power tool is a drill hammer.

14. A power tool comprising
    at least a first and a second housing part (13),
    a plurality of electrical components or electric motor components, said plurality of components comprising at least one element from the group composed of an electrical motor, a motor shaft, an armature, a throttle, a brush, or a brush holder, and
    one fastening element (1) for fastening said plurality of components to the first housing part (13) in such a way that the components are fixed between an inside of the first housing part (13) and the fastening element (1), wherein the one fastening element (1) also comprises a guide conduit (2) for carrying air.

15. The power tool as recited in claim 14, wherein the one fastening element (1) comprises further components (11), which are located directly on the one fastening element (1).

16. The power tool as recited in claim 14, wherein the one fastening element (1) comprises an electric contact lug and/or at least one cable hold-down device (8).

17. The power tool as recited in claim 14, wherein the one fastening element (1) comprises a covering region (5, 6) for covering dirt-threatened components.

* * * * *